Nov. 29, 1955     W. L. WILLCOX     2,725,185
VACUUM CONTROLLED DRIVE FOR FANS
Filed Nov. 4, 1952

INVENTOR.
William L. Willcox
By: Fred Gerlach
his Atty.

United States Patent Office 2,725,185
Patented Nov. 29, 1955

2,725,185
VACUUM CONTROLLED DRIVE FOR FANS
William L. Willcox, Miami, Fla.

Application November 4, 1952, Serial No. 318,723

5 Claims. (Cl. 230—271)

The invention relates to mechanism for controlling the operation of fans for engines used on vehicles.

One object of the invention is to provide an improved device for automatically controlling the operation of a fan responsive to the temperature of the engine, for fuel saving purposes.

Another object of the invention is to provide an automatic control device for driving the fan responsively to predetermined variations in temperature, which is compact in construction, efficient in operation and can be produced at a low cost.

The mechanism is characterized by an engine-driven pulley and a fan hub, which has confronting driving faces, one of the elements being slidable into and out of engagement with the other for controlling the operation of the fan, and by a recess in the fan hub which contains a vacuum responsive device surrounding the shaft for controlling the operation of the fan.

Other objects of the invention will appear from the detailed description.

The invention consists in the several novel features hereinafter set forth and more particularly defined by claims at the conclusion hereof.

Figure 1:
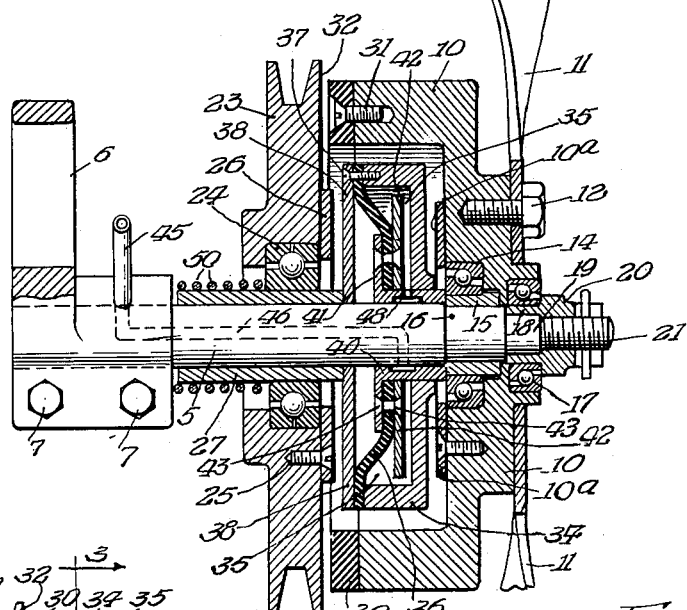
Fig. 1 is a longitudinal section of mechanism embodying the invention, the drive pulley being shown in its idling position.

The improved mechanism comprises a shaft 5, which has one of its ends fixedly supported on a bracket 6 which is adapted to be secured to any suitable part of an internal combustion engine. Shaft 5 is fixedly secured in bracket 6, which may have a lower split portion in which shaft 5 is clamped by bolts 7.

The fan comprises a hub 10 and blades 11 secured on the outer side of said hub by screws 12. Hub 10 is journalled on a ball bearing 14 which includes an outer race which is fixed in hub 10 and an inner race on a sleeve 15 which is confined on a portion 16 of shaft 5. A thrust ball-bearing 17 is disposed in a recess in the outer end of hub 10 and extends around a sleeve 18 on a portion 19 of shaft 5. A ring 10a is secured to the inner side of hub 10 for holding the bearing 14 in its recess in hub 10. A nut 20 on a screw threaded stem 21 on shaft 5 engages the outer side of ball bearing 17 and retains the bearings 14 and 17 against axial movement on shaft 5 so that the hub 10 will be held against axial movement on said shaft.

A pulley 23 for driving hub 10 of fan 11 is adapted to be driven by a V-belt (not shown) from the engine while it is running, as well understood in the art. Pulley 23 is journalled on a ball bearing 24, which includes an outer race secured in an annular recess in the hub of pulley 23 by a ring 26 which is secured by screws 25 to the inner face of pulley 23, and an inner race which is fixedly secured on a collar 27 which is slidable on shaft 5. A ring 30 of frictional material is secured by screws 31 to the inner face of the rim of fan hub 10 and is adapted to be engaged by the confronting face 32 of pulley 23, for directly driving the fan from the pulley.

The uncoupling of pulley 23 and fan hub 10 is controlled by a vacuum or suction responsive device which includes a case 34 defining a cylindrical chamber 35, a diaphragm 36 having its outer margin secured by screws 37 between the rim of case 34 and an end plate 38, and its inner portion secured by rivets 43 and a clamping plate 42 against a flange 41 integral with a sleeve 40 which is slidable on shaft 5. One end of sleeve 40 abuts against the inner stationary race of bearing 14 in the hub 10 of the fan. The case 34 is slidable on sleeve 40 and its end plate 38 is slidable on shaft 5 and is adapted to slide the collar 27 on said shaft for disengaging the pulley from the fan hub. The vacuum device is disposed in an annular recess 44 in the side of 10 which confronts the driving face 32 of pulley 23, and is adapted to shift collar 27 for shifting the pulley 23 out of engagement with hub 10. Vacuum in chamber 35 is adapted to urge sleeve 40 against the inner race of bearing 14 and move the case 34 relatively to the sleeve 40 and central portion of the diaphragm so that its end plate 38 will shift collar 24 outwardly and shift pulley 23 away from hub 10. A spring 50 around collar 24 and between the inner race of bearing 24 and bracket 6 is adapted to urge the pulley into engagement with hub 10 for driving the fan. When the vacuum in chamber 35 is released, spring 50 will shift the collar 27 and bearing 24 until the driving face 32 of pulley engages the friction ring 30 for driving the fan.

The vacuum device is controlled by a thermostatically controlled valve which controls a vacuum connection from the intake manifold of the engine, as well understood in the art. The vacuum connection from the thermostatically controlled valve (not shown) includes a pipe 45 which is connected to a bracket 6, a connecting port 46 in shaft 5, an annular groove 47 in the sleeve 40, communicating with port 46 and with holes 48 in sleeve 40 which communicate with the chamber 35.

Figure 2:
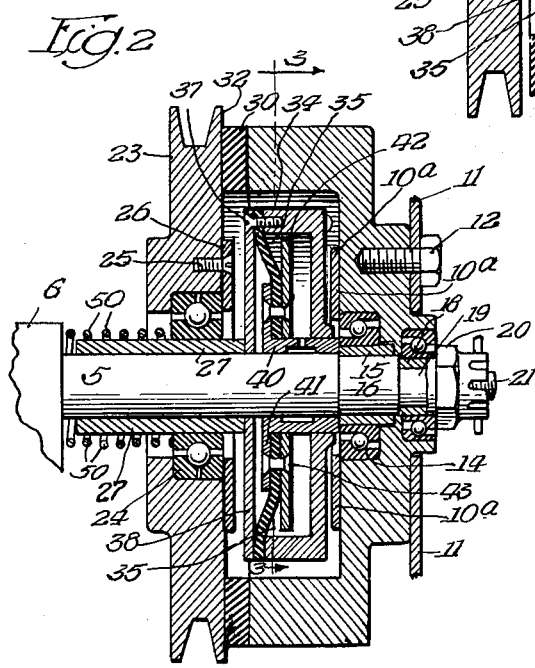
Fig. 2 is a similar section illustrating the drive pulley and the fan hub engaged for driving the fan.
Figure 3:
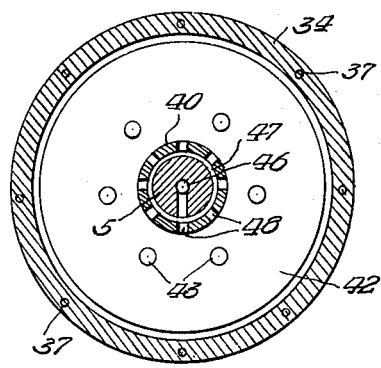
Fig. 3 is a section of a suction chamber taken on line 3—3 of Fig. 2.

The operation will be as follows: While the engine is running and the operation of the fan is necessary for cooling the engine, when the temperature exceeds for example 165° Fahr., no suction will be applied, to chamber 35 and spring 50 will hold collar 27 and bearing 24 in the position shown in Fig. 2. The driving face 32 of pulley 23 will be pressed against the friction ring 30 on hub 10 for driving the fan. The fan will then be driven from pulley 23. The diaphragm 36 will hold sleeve 40 out of pressure engagement with the inner race of bearing 14 and the end plate 38 out of pressure engagement with collar 27, so that the case 34 and sleeve 40 will not rotate with the pulley or the hub 10 of the fan. Spring 50 will exert pressure on bearing 24 for effective driving engagement between the pulley 23 and the hub of the fan. While the engine is running and the operation of the fan is not necessary for cooling the engine to a desired predetermined range, for example, 155° to 165° Fahr., the thermostatically controlled suction from the engine manifold to pipe 45 will be applied to the chamber 35 in case 34, through port 46, channel 47 and holes 48 in sleeve 40. The vacuum in chamber 35 will flex the central portion of the diaphragm 36 to force the sleeve 40 into abutting engagement with the inner race of bearing 14 and force the case 34 and plate 38 into the position shown in Fig. 1. Plate 38 will abut against the inner end of collar 27 and slide bearing 24 and pulley 23 outwardly on shaft 5 against the force of spring 50 until the driving face 32 of pulley 23 is disengaged from the friction ring 30 on hub 10. The pulley 23 will then be free to idly rotate on bearing 24 and the hub 10 will remain idle. While the pulley 23 is uncoupled from hub 10, the pressure of the end plate 38 and the sleeve 40 will be applied to the inner race of bearings 24 and 14 respectively, and no endwise pressure will be applied by the vacuum device to the hub 10 of the fan. This permits the fan to windmill or rotate freely by the air pressure while the vehicle is travelling. When the temperature of the engine increases above the predetermined range, the thermostatic control will cut off vacuum from the intake manifold to the pipe 45 and chamber 35. Spring 50 acting on collar 27 and the inner race of bearing 24 will force said bearing and the pulley 23 inwardly to engage the driving face 32 of the pulley and friction ring 30 on the hub, as shown in Fig. 2 for again operating the fan until the temperature of the engine drops below the predetermined range, and vacuum is again connected to chamber 35 to shift pulley 23 back to the position shown in Fig. 1.

The invention exemplifies a device or mechanism for controlling the operation of the fan responsive to temperature changes in the coolant for the engines, in which the belt pulley is slidable on the supporting shaft for coupling and uncoupling the fan and the pulley and for simplicity in construction and operation.

The case for the suction or vacuum chamber is disposed in a recess in the fan hub for compactness and for the operation of the spring pressed collar which is adapted to shift the belt pulley into coupled relation with the fan hub.

The invention is usable with the thermostatic valve set forth in my application, Serial No. 318,724 filed November 4, 1952.

The invention is not to be understood as restricted to the details set forth since these may be modified within the scope of the appended claims without departing from the spirit and scope of the invention.

Having thus described my invention, what I claim as new and desire to secure by Letters Patent is:

1. Driving mechanism for a fan on an engine-driven vehicle, comprising; a shaft, an engine-driven pulley journalled and slidable on the shaft and provided with a friction driving-face, a fan-hub journalled on and confined against axial movement on the shaft, means for urging the pulley to engage the hub; and a fluid pressure responsive device for disengaging the pulley from the hub including a casing slidable on the shaft to move the pulley away from the hub, a sleeve slidable on the shaft and relatively to the casing, means for arresting the movement of the sleeve away from the pulley, a flexible radially extending diaphragm connecting the casing and sleeve, the casing, diaphragm and sleeve defining an annular vacuum chamber around the shaft, and a connection for producing vacuum in said chamber and relative sliding movement of the casing and the sleeve and forcing the pulley away from the hub, the pulley being engaged to rotate the hub without rotation of the casing, diaphragm and sleeve, when the vacuum is released.

2. Driving mechanism for a fan on an engine-driven vehicle, comprising; a non-rotatable shaft, an engine-driven pulley provided with a friction driving-face, a collar slidable on the shaft and on which the pulley is journalled, a fan-hub journalled on and confined against axial movement on the shaft, a spring for urging the pulley to engage the hub, and a fluid pressure responsive device for disengaging the pulley from the hub including a casing slidable on the shaft to move the pulley away from the hub, a sleeve slidable on the shaft and relatively to the casing, means for arresting the movement of the sleeve away from the pulley, a flexible radially extending diaphragm between the casing and the sleeve, connecting the casing and sleeve, the casing, diaphragm and sleeve defining an annular vacuum chamber around the shaft, and a connection for producing vacuum in said chamber and relative sliding movement of the casing and the sleeve and forcing the pulley away from the hub, the pulley being engaged to rotate the hub without rotation of the casing, diaphragm and sleeve, when the vacuum is released.

3. Driving mechanism for a fan on an engine-driven vehicle, comprising; a shaft, an engine-driven pulley provided with a friction driving-face, a fan-hub journalled on and axially confined on the shaft and provided with a driving-face confronting the driving-face on the pulley, a journal for the pulley slidable on the shaft to and from the hub, means for urging the pulley to engage the pulley with the hub, and a fluid pressure responsive device for disengaging the pulley from the hub, including a casing slidable on the shaft and away from the hub and adapted to shift the journal for the pulley away from the hub, a sleeve slidable on the shaft relatively to the casing and adapted to be arrested by the hub, a radially extending flexible diaphragm having its margin sealed to the casing and its inner portion sealed to the sleeve, the casing, diaphragm and sleeve defining a vacuum chamber, and a connection for producing vacuum in said chamber and relatively shifting the casing and sleeve for disengaging the pulley from the hub, the pulley-journal and pulley being shiftable by urging means for engaging the pulley and the hub when the vacuum is released, for rotation of the pulley, and the hub without rotation of the casing, diaphragm and sleeve.

4. Driving mechanism for a fan on an engine-driven vehicle, comprising; a non-rotatable shaft, an engine-driven pulley provided with a friction driving-face, a fan-hub rotated around the shaft and provided with a driving-face confronting the driving-face on the pulley, a journal for the pulley slidable on the shaft to and from the hub, a spring for urging the pulley to engage the pulley with the hub, a journal for the hub axially confined on the shaft, and a fluid pressure responsive device for disengaging the pulley from the hub, including a casing slidable on the shaft and away from the hub and adapted to shift the journal for the pulley away from the hub, a sleeve slidable on the shaft relatively to the casing and adapted to be arrested by the journal for the hub, a radially extending flexible diaphragm having its margin sealed to the casing and its inner portion sealed to the sleeve, the casing, diaphragm and sleeve defining a vacuum chamber, and a connection for producing vacuum in said chamber and relatively shifting the casing and sleeve for disengaging the pulley from the hub, the pulley-journal and pulley being shiftable by spring means for engaging the pulley and the hub when the vacuum is released, for rotation of the pulley and the hub without rotation of the casing, diaphragm and sleeve.

5. Driving mechanism for a fan on an engine-driven vehicle, comprising; a shaft, an engine-driven pulley provided with a friction driving-face, a fan hub provided with a driving-face confronting the driving-face on the pulley, a collar axially slidable on the shaft to and from the hub, an outer friction journal for the pulley including an inner race on the collar and an outer race on the pulley, a spring for urging the pulley to engage the hub, an anti-friction journal for the hub including inner and outer races on the shaft and the hub, respectively, and a fluid pressure responsive device for disengaging the pulley from the hub, including a casing slidable on the shaft and relatively to the hub and adapted to engage the collar, a sleeve slidable on the shaft relatively to the casing and adapted to be arrested by the inner race of the hub-journal, a radially extending flexible diaphragm having its margin sealed to the casing and its inner portion sealed to the sleeve, the casing, diaphragm and sleeve defining a vacuum chamber, and a connection for producing vacuum in said chamber and relatively shifting the casing and sleeve for shifting the pulley away from the hub, the pulley-journal and pulley being shiftable by the spring for engaging the pulley and the hub when the vacuum is released, for rotation of the pulley and the hub without rotation of the casing, diaphragm and sleeve.

References Cited in the file of this patent

UNITED STATES PATENTS

| Number | Name | Date |
| --- | --- | --- |
| 1,374,901 | Blankenhorn | Apr. 19, 1921 |
| 1,921,042 | Roos | Aug. 8, 1933 |
| 2,022,709 | Embery et al. | Dec. 3, 1935 |
| 2,637,308 | Dodge | May 5, 1953 |
| 2,661,148 | Englander | Dec. 1, 1953 |